(12) United States Patent
Eckhardt

(10) Patent No.: US 8,733,407 B2
(45) Date of Patent: May 27, 2014

(54) DEVICE FOR ADDING AIR AND/OR SEALING MEANS TO A TIRE

(75) Inventor: Arnold Eckhardt, Randstadt (DE)

(73) Assignee: Sumitomo Rubber Industries Limited, Kobe (JP)

( * ) Notice: Subject to any disclaimer, the term of this patent is extended or adjusted under 35 U.S.C. 154(b) by 708 days.

(21) Appl. No.: 12/995,858

(22) PCT Filed: Jun. 5, 2009

(86) PCT No.: PCT/EP2009/004066
§ 371 (c)(1),
(2), (4) Date: Feb. 11, 2011

(87) PCT Pub. No.: WO2009/146939
PCT Pub. Date: Dec. 10, 2009

(65) Prior Publication Data
US 2011/0126938 A1 Jun. 2, 2011

(30) Foreign Application Priority Data
Jun. 6, 2008 (DE) .......................... 10 2008 027 024

(51) Int. Cl.
*B65B 31/00* (2006.01)
*B29C 73/16* (2006.01)
(52) U.S. Cl.
CPC .................................... *B29C 73/166* (2013.01)
USPC ................ 141/38; 141/67; 141/104; 141/105
(58) Field of Classification Search
USPC ....................................... 141/38, 67, 100–105
See application file for complete search history.

(56) References Cited

U.S. PATENT DOCUMENTS

| 4,765,367 A | 8/1988 | Scott |
| 4,776,766 A * | 10/1988 | Brent ........................... 417/44.6 |

(Continued)

FOREIGN PATENT DOCUMENTS

| DE | 195 45 935 A1 | 1/1997 |
| DE | 198 46 451 A1 | 4/2000 |

(Continued)

OTHER PUBLICATIONS

International Preliminary Report on Patentability for Application No. PCT/EP2009/004066 dated Dec. 16, 2010.

(Continued)

*Primary Examiner* — Timothy L Maust
(74) *Attorney, Agent, or Firm* — Birch, Stewart, Kolasch & Birch, LLP

(57) ABSTRACT

A device for the introduction of air and/or sealant into a tire, in particular a motor vehicle tire, having an electric pump or compressor, an electric connection cable for the pump or compressor which has a connection element, in particular a plug, at its end for the connection of the connection cable to a power supply, in particular to the cigarette lighter of a motor vehicle, having a hose for the air and/or the sealant which is or can be connected to the electric pump or compressor and whose other end can be connected to the tire to be filled, and having a housing for the reception of at least some of the device components, wherein the housing has in each case a separate receiver for the connection cable, on the one hand, and the connection element of the connection cable, on the other hand to improve the handling of the device.

4 Claims, 4 Drawing Sheets

(56) References Cited

U.S. PATENT DOCUMENTS

Figure 1:
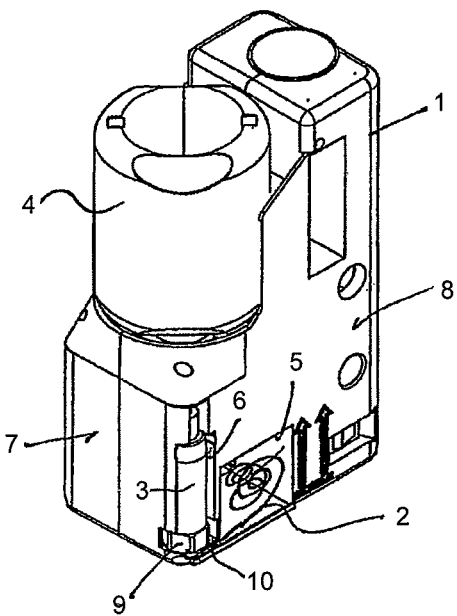

| | | |
|---|---|---|
| 6,283,172 B1 | 9/2001 | Thurner |
| 6,705,360 B1 * | 3/2004 | Bonzer ............................ 141/38 |
| 6,736,170 B2 | 5/2004 | Erikesen et al. |
| 6,766,834 B1 | 7/2004 | Eckhardt |
| 6,789,581 B2 * | 9/2004 | Cowan et al. .................... 141/38 |
| 6,889,723 B2 * | 5/2005 | Gerresheim et al. ............. 141/38 |
| 6,964,284 B2 * | 11/2005 | Eckhardt .......................... 141/38 |
| 8,016,002 B2 * | 9/2011 | Yoshida et al. .................. 141/38 |
| 8,146,622 B2 * | 4/2012 | Guan et al. ....................... 141/38 |
| 8,459,150 B2 * | 6/2013 | Yoshida et al. ................. 81/15.6 |
| 2003/0047652 A1 | 3/2003 | Eckhardt |
| 2003/0056851 A1 | 3/2003 | Eriksen et al. |
| 2005/0056358 A1 | 3/2005 | Eriksen et al. |
| 2008/0029181 A1 | 2/2008 | Marini |
| 2008/0098855 A1 | 5/2008 | Cegelski et al. |
| 2010/0101375 A1 | 4/2010 | Yoshida et al. |

FOREIGN PATENT DOCUMENTS

| | | |
|---|---|---|
| DE | 199 48 706 A1 | 7/2000 |
| DE | 101 06 468 A1 | 8/2002 |
| DE | 202 11 295 U1 | 12/2002 |
| DE | 202 12 101 U1 | 1/2003 |
| DE | 20 2007 016 242 U1 | 3/2008 |
| DE | 102007003667 A1 | 7/2008 |
| EP | 1 291 158 A1 | 3/2003 |
| EP | 0 938 408 B1 | 4/2003 |
| EP | 1 358 996 A1 | 11/2003 |
| EP | 1 463 626 B1 | 10/2004 |
| EP | 1 722 961 B1 | 11/2006 |
| EP | 1 894 707 A1 | 3/2008 |
| EP | 1 723 016 B1 | 4/2009 |
| EP | 2 067 674 A1 | 6/2009 |
| EP | 1 961 632 B1 | 4/2010 |
| WO | WO 99/14031 A1 | 3/1999 |
| WO | WO 00/21875 A1 | 4/2000 |
| WO | WO0258926 | 1/2002 |
| WO | WO 03/004328 A1 | 1/2003 |
| WO | WO 2004/041649 A1 | 5/2004 |
| WO | WO 2005/085028 A1 | 9/2005 |
| WO | WO 2007/102066 A2 | 9/2007 |
| WO | WO 2008/001179 A2 | 1/2008 |
| WO | WO 2008/035163 A2 | 3/2008 |
| WO | WO 2008/075719 A1 | 6/2008 |
| ZA | 96/5816 | 1/1997 |

OTHER PUBLICATIONS

International Search Report, dated Jan. 21, 2010, for Application No. PCT/EP2009/004066.

Extended European Search Report for Application No. 10015197.6 dated Jan. 7, 2013 (with English translation).

* cited by examiner

DEVICE FOR ADDING AIR AND/OR SEALING MEANS TO A TIRE

The present invention relates to a device for the introduction of air and/or sealant into a tire, in particular a motor vehicle tire, having an electric pump or compressor, an electric connection cable for the pump or compressor which has a connection element, in particular a plug, at its end for the connection of the connection cable to a power supply, in particular to the cigarette lighter of a motor vehicle, having a hose for the air and/or the sealant which is or can be connected to the electric pump or compressor and whose other end can be connected to the tire to be filled, and having a housing for the reception of at least some of the device components.

Such components have in the meantime frequently been used as so-called puncture repair kits as replacement for spare wheels.

It is the underlying object of the invention to improve the handling of such a device.

This object is satisfied in that the housing for the connection cable, on the one hand, and the connection element of the connection cable, on the other hand, each have their own receiver.

The handling is simplified with respect to known devices by the arrangement of the connection cable and of the connection element in their own receivers in the housing. The connection element can in particular be removed immediately and connected to a power supply, whereas with known devices with only one receiver the connection element is frequently not immediately obvious. The connection element is rather often covered by cable sections. It thereby not only has to be disentangled laboriously, but it is also frequently not even immediately visible so that it is not straightaway clear to the user what he should establish the electrical connection with.

The receiver for the connection element is preferably largely adapted to the connection element with respect to the dimensions. This saves room, on the one hand, and has the advantage, on the other hand, that the connection element is fixed in the housing.

It is furthermore preferred for the receiver to have a recess for a finger intervention or to be designed such that a part of the connection element projects beyond the receiver and can be gripped easily from the outside. The removal of the connection element is thereby further simplified.

To make the handling immediately recognizable, the receiver for the connection element is arranged in an easily visible region of the housing in accordance with a further embodiment of the invention, preferably in a side wall or in a corner region engaging over two adjacent sides of the housing.

It is moreover preferred for both receivers to be arranged directly next to one another. Only a short cable crossover between the two receivers is thereby required. It is preferably guided in the housing so that no cable projects outwardly beyond the housing.

It is furthermore preferred for the longitudinal extent of the connection element to stand upright in the position of use of the housing. The connection between the two receivers in this case is preferably arranged in the lower region of the receiver for the connection element. This is in turn also particularly favorable from a handling aspect.

In accordance with a further embodiment of the invention, which is also claimed per se, a switching valve is provided for the switching over of the connection between the electric pump or compressor, on the one hand, and selectively a connection to the container or to the hose for the introduction of medium or sealant into the tire, on the other hand, said switching valve preferably being designed as a 3/2-way valve. The device in accordance with the invention can be used in a simple manner either only for the inflation of a flat tire or for the sealing and subsequent inflation of a tire by such a switching valve. The device thereby has a higher commercial value.

In accordance with a preferred further development of the invention, the switch valve has a pressure relief for the discharge of the compressed air in intermediate positions. The actuation of the switch valve is thereby facilitated.

The switch valve can for this purpose in particular have a valve core rotatably journaled in a housing and having an inlet opening and two outlet openings which are sealed all around with respect to the valve housing, whereas the valve core is in another respect not sealed or not completely sealed with respect to the valve housing. It is ensured by the sealing around the openings that the compressed air of the compressor is completely supplied to the container with the sealant or to the hose for the direct inflation of the tire. Due to the lack of a seal in the remainder, the compressed air can flow off in intermediate positions, namely via the clearance between the valve core and the housing.

To facilitate the flowing off of the compressed air in intermediate positions, the valve core can preferably have a circumferential ring groove at at least one side of the openings. This is also simple and cost-effective from a technical manufacturing aspect. An even further improvement of the outflow results when the ring groove communicates with the outer space via at least one blind hole or one passage opening.

Figure 2:
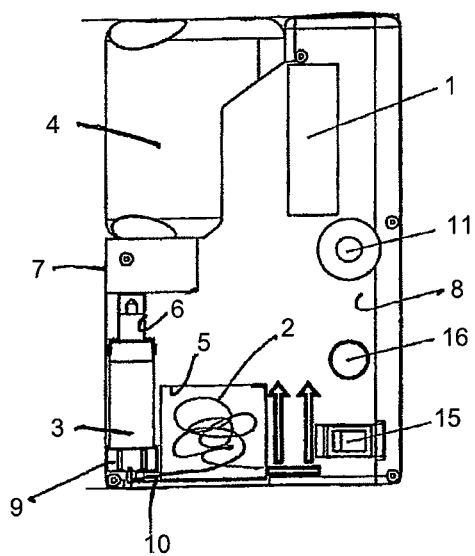
Figure 3:
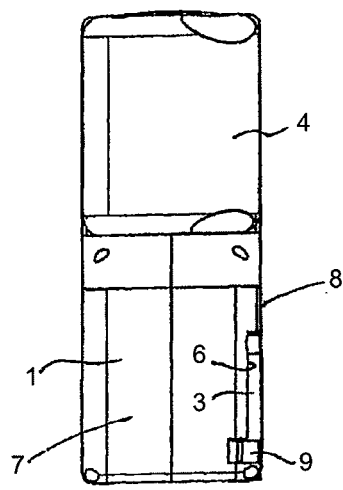
Figure 4:
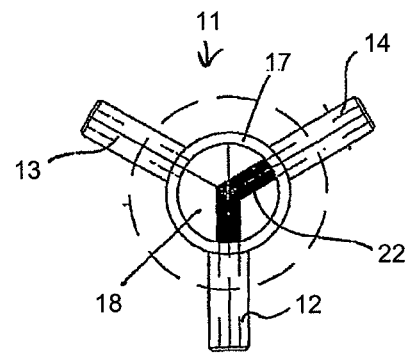
Figure 5:
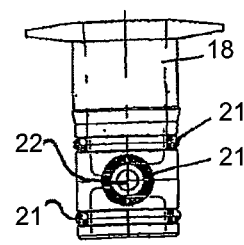
Figure 6:
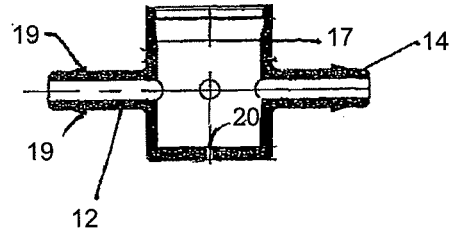
Figure 7:
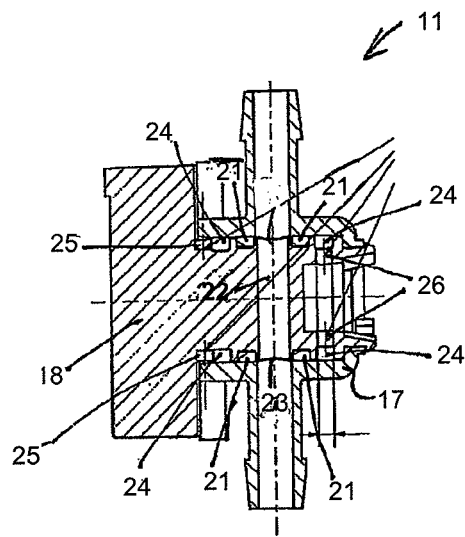
Figure 8:
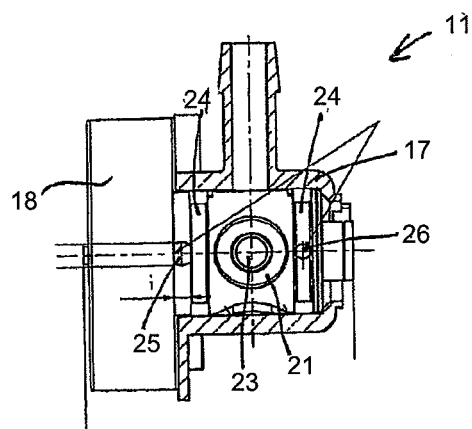

An embodiment of the invention is shown in the drawing and will be described in the following. There are shown, in each case in a schematic representation:

FIG. 1 a perspective view of a device in accordance with the invention;

FIG. 2 a side view of the device of FIG. 1;

FIG. 3 a side view rotated through 90°;

FIG. 4 a view of a 3/2-way valve of the device of FIG. 1;

FIG. 5 a side view of the valve core of the valve of FIG. 4;

FIG. 6 a vertical section through the housing of the valve of FIG. 4;

FIG. 7 a section through a variant of the 3/2 way valve of the apparatus of FIG. 1; and FIG. 8 a section of the variant of FIG. 7 rotated by 90°.

The device shown in FIGS. 1 to 3 comprises a housing 1, an electric pump or compressor arranged in the housing 1 and not recognizable here, and an electric connection cable 2 which has a connection element 3, in particular a plug, at its end for the connection of the connection cable 2 to a power supply, in particular to the cigarette lighter of a motor vehicle. In addition, the device includes a hose for the air and/or the sealant, which is not recognizable in the drawing, which is or can be connected to the compressor, and whose other end can be connected to the tire to be filled, an ON/OFF switch 15 as well as an LED 16 to display the operational readiness of the device. Finally, a container 4 is shown which contains the sealant and which is inserted upside down into a corresponding receiver of the housing 1.

The connection cable 2 is accommodated in a first receiver 5 of the housing 1, whereas the plug 3 is inserted into a second receiver 6 of the housing 1. As can be seen, the two receivers 5 and 6 are arranged next to one another, with the receiver 6 for the plug 3 being provided in a corner region between a narrow side 7 and a wide side 8 of the housing 1. The receiver 6 for the plug 3 is designed in this connection such that the plug 3 can be arranged in an upright position. In addition, the receiver 6 is made such that a lower part 9 of the plug 3 projects beyond the walls 7 and 8 of the housing 1. In this manner, the plug 3 can be gripped easily from the outside.

A leadthrough 10 accessible from the outside is present between the receiver 5 for the connection cable 2 and the receiver 6 for the plug 3 and the cable leading to the plug 3 is placed into said leadthrough. The cable 2 thereby does not project beyond the housing 1.

FIG. 4 shows a detail arranged in the housing 1, namely a switching valve 11 to switch over the connection between the electric pump or compressor, on the one hand, and selectively a connection to the container 4 to a first hose for the introduction of medium or sealant into the tire or to a second hose for the pure inflation of the tire, on the other hand. The valve 11 shown in FIG. 4 is a 3/2-way valve having an inlet 12, which is connected to the electric pump or the compressor, and two outlets 13 and 14, of which the one is connected to the container 4 and the other to the second hose.

A tire can selectively only be inflated or first supplied with sealant and then inflated by this 3/2-way valve 11. If the tire should only be inflated, the inlet 12 is directly connected to the outlet 13 to the second hose in that the directional valve 11 is switched accordingly. If, in contrast, first sealant should be introduced into the tire, the inlet 12 is thus connected to the outlet 14 which is in communication with the container 4. The air delivered by the electric pump or compressor is thereby first introduced into the container 4 and thereby empties it into the first hose which leads to the tire. Only after the emptying of the container 4 is air then introduced in this way into the tire to inflate the tire. It would also be possible only to use one hose. This is then connected both to the outlet 13 and to the outlet of the container 4. Incorrect flows can be avoided by check valves.

FIGS. 5 and 6 show the structure of the 3/2-way valve 11 which includes a housing 17 and a valve core 18. The housing 17 is made in the form of a pot. The inlet 12 and the two outlets 13 and 14 are shaped in the manner of stubs to the housing 17 and are provided with radially outwardly projecting noses 19 to ensure a secure fastening of a connection hose, not shown here. A venting hole 20 is provided in the base of the housing 17.

The valve core 18 is made in T shape in cross-section and has four O rings for sealing of which only three can be recognized in FIG. 5. An angled flow passage 22 is formed in the valve core 18 and, depending on the setting of the valve 11, the inlet 12 can selectively be connected to one of the two outlets 13 and 14 via said flow passage. As can be seen in FIG. 5, two of the O rings 21 are provided above and below the passage 22, whereas the third O ring 21 and the fourth O ring, not recognizable in FIG. 5, are arranged around the inlet opening or outlet opening of the flow passage 22. A secure sealing of the flow passage 22 and of the inlet 12 as well as of the outlets 13 and 14 is thereby ensured. The switching over of the valve 11 can take place in any desired manner, for example mechanically, but also electrically or pneumatically. A different sealing can naturally also be used instead of O rings, for example worked-in thermoplastic elastomer (TPE).

The 3/2 way valve 11 shown in FIGS. 7 and 8 coincides with respect to its basic structure with the previously described 3/2 way valve 11. However, in contrast to this it has a pressure relief to discharge the compressed air of the compressor in intermediate positions. To realize the pressure relief, this variant of the 3/2 way valve 11 only has O rings 21 around the openings 23 of the throughflow passage 22, whereas the valve core 18 is otherwise made without a seal. As with the previously described variant, ring grooves 24 are admittedly present at both sides of the openings 23, but no O rings are inserted in them. Compressed air can thereby flow off via the clearance between the valve core 18 and the valve housing 17 in intermediate positions of the valve 11. To facilitate the outflow, two blind bores 25 as well as two passage bores 26 are also provided which connect the two ring grooves 24 to the outer space.

REFERENCE NUMERAL LIST 1 housing
2 connection cable
3 plug
4 container
5 first receiver
6 second receiver
7 narrow side
8 wide side
9 part of 3
10 leadthrough
11 3/2-way valve
12 inlet
13 outlet
14 outlet
15 ON/OFF switch
16 LED
17 valve housing
18 valve core
19 nose
20 venting hole
21 O ring
22 flow passage
23 opening
24 ring groove
25 blind bore
26 passage bore

The invention claimed is:

1. A device for the introduction of air and/or sealant into a tire comprising:
   an electric pump or compressor,
   an electric connection cable for the pump or compressor which has a connection element at its end for the connection of the connection cable to a power supply,
   a hose for the air and/or the sealant having a first end that is or can be connected to the electric pump or compressor and a second end that can be connected to the tire to be filled,
   a housing for the reception of at least some components of the device,
   a switching valve that switches the connection between the electric pump or compressor, and selectively to a container having a hose for the introduction of air or sealant into the tire or to a hose for the pure inflation of the tire,
   wherein the switching valve has a pressure relief for the discharge of the compressed air in intermediate positions of the valve, a valve core rotatably journalled in a switching valve housing, an inlet opening and two outlet openings which are sealed all around with respect to the switching valve housing, wherein the valve core is otherwise not sealed or not completely sealed with respect to the valve housing.

2. A device according to claim 1, wherein the switching valve is designed as a 3/2-way valve.

3. A device according to claim 1, wherein the valve core has a circumferential ring groove as a pressure relief channel at least one side of the openings.

4. A device according to in accordance with claim 3 wherein the ring groove is in communication with the outer space via at least one blind bore and/or a passage opening.

\* \* \* \* \*